United States Patent [19]

Thorman et al.

[11] Patent Number: 5,383,376

[45] Date of Patent: Jan. 24, 1995

[54] HYDROSTATIC TRANSMISISON CONTROL STRUCTURE

[75] Inventors: Christopher S. Thorman, Beaver Dam; James A. Swartzendruber; Frank K. O'Toole, both of West Bend, all of Wis.

[73] Assignee: Deere & Company, Moline, Ill.

[21] Appl. No.: 105,559

[22] Filed: Aug. 12, 1993

[51] Int. Cl.⁶ .......................... G05G 1/14; B25G 3/28
[52] U.S. Cl. ...................................... 74/474; 74/519; 403/356; 403/383
[58] Field of Search .......................... 74/60, 474, 519; 403/355, 356, 383; 60/434; 92/12.2

[56] References Cited

U.S. PATENT DOCUMENTS

| | | | |
|---|---|---|---|
| 1,693,832 | 12/1928 | Vincent | 74/519 X |
| 2,976,702 | 3/1961 | Pietsch | 403/356 X |
| 3,060,706 | 10/1962 | Hess | 74/519 X |
| 3,528,311 | 9/1970 | Fieber | 74/474 X |
| 3,541,878 | 11/1970 | Haffner | 74/474 |
| 4,025,210 | 5/1977 | Johnson | 403/383 X |
| 4,285,305 | 8/1981 | Kaufman et al. | 403/356 X |
| 4,572,698 | 2/1986 | Rauch | 403/356 |
| 4,989,398 | 2/1991 | Kuhn et al. | |
| 5,094,326 | 3/1992 | Schemelin et al. | 74/474 X |
| 5,233,880 | 8/1993 | Sato et al. | 74/474 |

FOREIGN PATENT DOCUMENTS

263871 9/1927 United Kingdom ................ 403/356

OTHER PUBLICATIONS

Rich, L. M., "15 Ways to Fasten Gears to Shafts," Product Engineering, May 30, 1960, pp. 43–47.
Eaton Corporation Hydraulic Division, Eaton Medium Duty Hydrostatic Drives–Principle of Operation 70342 Piston Pump 74318 Piston Motor, front and back covers and pp. 2–6, dated Jan. 1992, published in the U.S.A.
Eaton Corporation, Exploded Transmission Drawing, 1 page, dated 1993, published in the U.S.A.
The Toro Co., Toro Parts Catalog for Greensmaster 3000, front and back covers and pp. 6–7, dated 1987, published in the U.S.A.
Lesco Inc., The Lesco 500 Fairway Mower, front and back covers and pp. 11–12, dated 1988, published in the U.S.A.
Jacobsen Div. of Textron Inc., Operator's Manual with Parts List for Greens King IV, front and back covers and pp. 36–37, dated 19 Jan. 1989, published in the U.S.A.
Deere & Co., John Deere F510 and F525 Front Mowers Parts Catalog, front cover and pp. 50–6 and 50–7, dated 21 Sep. 1990, published in te U.S.A.
Deere & Co., John Deere 2653 Professional Utility Mower Parts Catalog, front cover and pp. 60–10 and 60–11, dated Jan. 1993, published in the U.S.A.

*Primary Examiner*—Allan D. Herrmann

[57] ABSTRACT

A control structure is provided for the swash plate of a hydraulic transmission pump. The structure is adapted to return the swash plate to its neutral orientation and thereby prevent creep or slight movement in the vehicle when the transmission is returned to neutral. The structure takes the form of a tapered hub adapted to be accurately mounted on a tapered swash plate control shaft and configured to be precisely received in a compatably shaped control lever. The lever, in turn, is actuated by the operator foot pedals and returned to its neutral setting by a V-type neutral cam locator. The hub is produced through a powder metal process and with its unique configuration for being mounted in a lever recess can be utilized with a variety of lever shapes and configurations to permit its use in a variety of vehicles and hydrostatic transmission models.

17 Claims, 3 Drawing Sheets

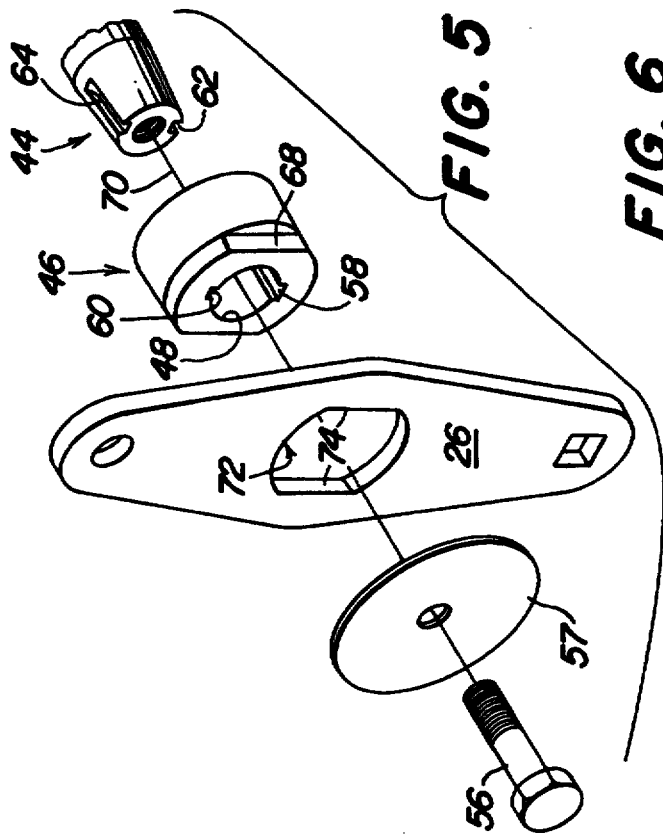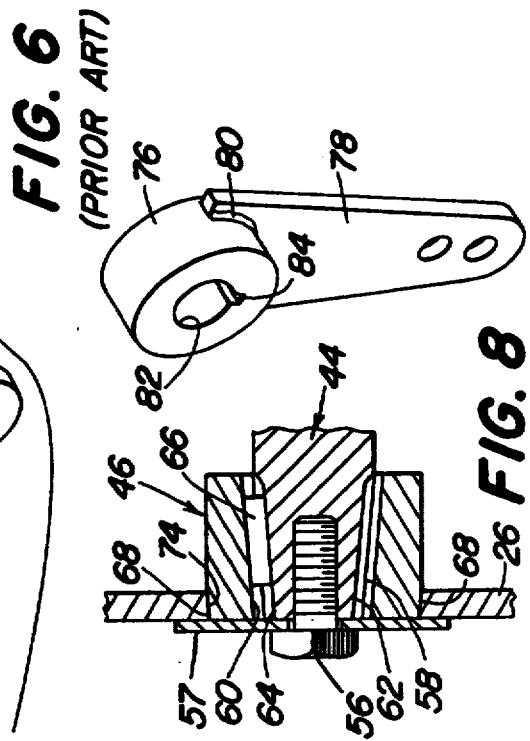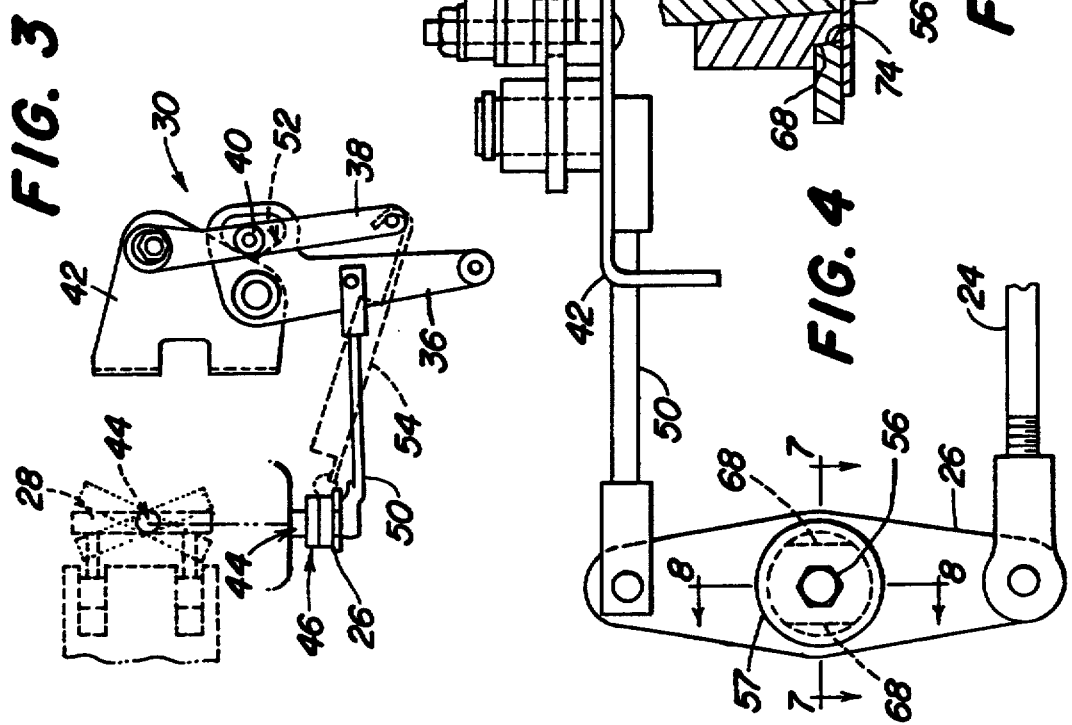

HYDROSTATIC TRANSMISISON CONTROL STRUCTURE

BACKGROUND OF THE INVENTION

1. Field of the Invention

The present invention relates generally to hydrostatic transmissions and more specifically to the control structure for shifting the swash plate of a hydrostatic transmission pump between its forward, neutral and drive orientations. More particularly the invention relates to a structure for precisely locating the swash plate in its neutral position whereby "creep" or small movements of the vehicle can be controlled.

2. Description of the Background Art:

Directional control of a vehicle having a hydrostatic transmission can be accomplished by shifting the swash plate of the transmission's hydraulic pump between first, second and third positions to operate the transmission motor in either its forward, neutral or reverse direction.

Since the swash plate controls the hydraulic fluid flow over a continuous range, very small incremental changes in flow rate are possible with small movements of the swash plate. When an operator wants to maintain the machine in an idle or neutral configuration, it is important that the swash plate be precisely located at its neutral or non-flow condition to avoid "creep" or slight movement of the vehicle.

In many transmissions, the orientation of the swash plate is controlled through rotating a shaft which is coupled with it. Commonly the shaft is fitted with a hub that is coupled with a control lever which can be rotated by directional control structures such as foot pedals to shift the swash plate between its forward, neutral, and reverse orientations.

Since, the swash plate must be returned to a "neutral" orientation to prevent vehicle movement, neutral locating structures, such as V-type cam surfaces utilizing cam rollers are also coupled with the control lever. These locating structures are provided to return the swash plate to the precise "neutral" position after the directional foot control pedals are released.

It is therefore important to provide a reliable linkage between the swash plate and the linkages connected with the control lever to assure that the plate is returned to its exact "neutral" orientation when desired. Since the orientation of the hub and lever are determined by the neutral locating structure, it is important that the hub be precisely coupled to the swash plate shaft as well as to the lever. To assure this relationship, keyway couplings have been provided between the shaft and hub. Further, the shaft and hub openings have been tapered to insure a tight fit between them. It is also important that the hub be accurately and precisely joined to the lever which is shifted by the neutral locating structure.

To manufacture the hub and lever structures so that they are precisely oriented with respect to one another, hubs have first been welded to the levers and then had the tapered and keyway openings machined into the hub. This is a very expensive, time-consuming procedure that can also require separate hub-lever combinations for different vehicle models.

To overcome this expense, it would be desirable to provide a hub that would precisely fit both the swash plate shaft and various lever sizes or configurations without requiring that the hub first be welded to a lever and then have its openings machined.

SUMMARY OF THE INVENTION

Accordingly, there is provided herein a hub which is equipped with locator surfaces that enable it to be positioned precisely with respect to a uniform opening in a control lever. This is accomplished through producing a hub having a pair of flat surfaces oriented generally parallel to one another, spaced from its center line axis and further, by providing those surfaces at an incline or angle to its axis to assure a precise fit between the hub and mating inclined surfaces provided in the mounting opening of the lever.

The hub is produced through a powder metal process and is further provided with an opening that is tapered to mate on a complementary reverse taper provided on the swash plate shaft. Two or more keyways can be provided at spaced locations in the hub to mate with corresponding keyways milled on the shaft to precisely locate the hub on the shaft. Alternately, the provision of two keyways can permit the hub to be used for two differing applications, each using only one of the keyways.

Accordingly, a hub which is precisely locatable within a standardized opening on any control lever configuration and which is also precisely locatable on a shaft that controls the swash plate is provided.

The hub design for precisely locating it with respect to a lever permits the hub to be used with a variety of lever sizes and shapes and, therefore, allows it to be used for a variety of machines having hydrostatic transmissions but different directional control structural arrangements.

BRIEF DESCRIPTION OF THE DRAWINGS

FIG. 3 is an enlarged schematic plan view of the hub, control lever and cam neutral locator structures.

FIG. 4 is a enlarged schematic plan view of the structures show in FIG. 3.

FIG. 5 is an exploded and enlarged perspective view of the hub and lever control elements.

FIG. 6 is a enlarged perspective view of a lever hub and combination found in the prior art.

FIG. 7 is an enlarged view of the shaft, hub and lever taken along lines 7—7 of FIG. 4.

FIG. 8 is an enlarged view of the shaft, hub and lever taken along lines 8—8 of FIG. 4.

BRIEF DESCRIPTION OF THE PREFERRED EMBODIMENT

Figure 1:
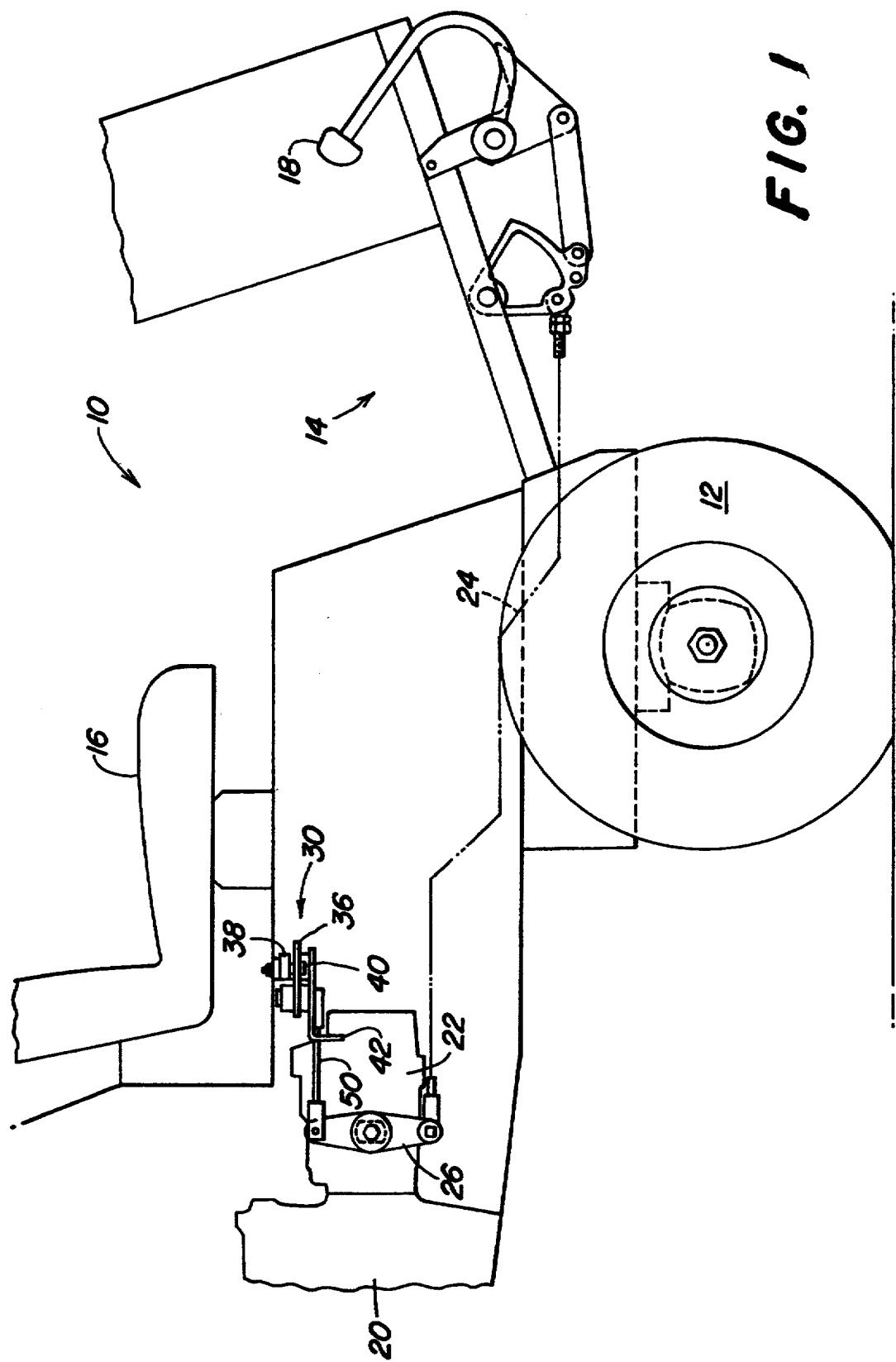
FIG. 1 is a schematic, partial side view of a vehicle and its directional control structure adapted to utilize the present invention.

Looking first to FIG. 1, there is partially illustrated, in schematic form, a front-mount lawn and garden vehicle 10 including front drive wheels 12, operator platform 14, operator seat 16 and directional control pedals 18 (only one of which is shown in this side view). Further illustrated in schematic form are the rear mounted engine 20, hydrostatic transmission 22 and directional control linkage 24. A control lever 26 is coupled with the transmission 22 for swingably rotating the pump's swash plate 28. A neutral locator structure 30 is connected with one end portion of the lever 26 for returning the swash plate 28 to neutral when the directional control foot pedals 18 and linkage 24, connected to the other end portion of the lever 26 are released.

Figure 2:
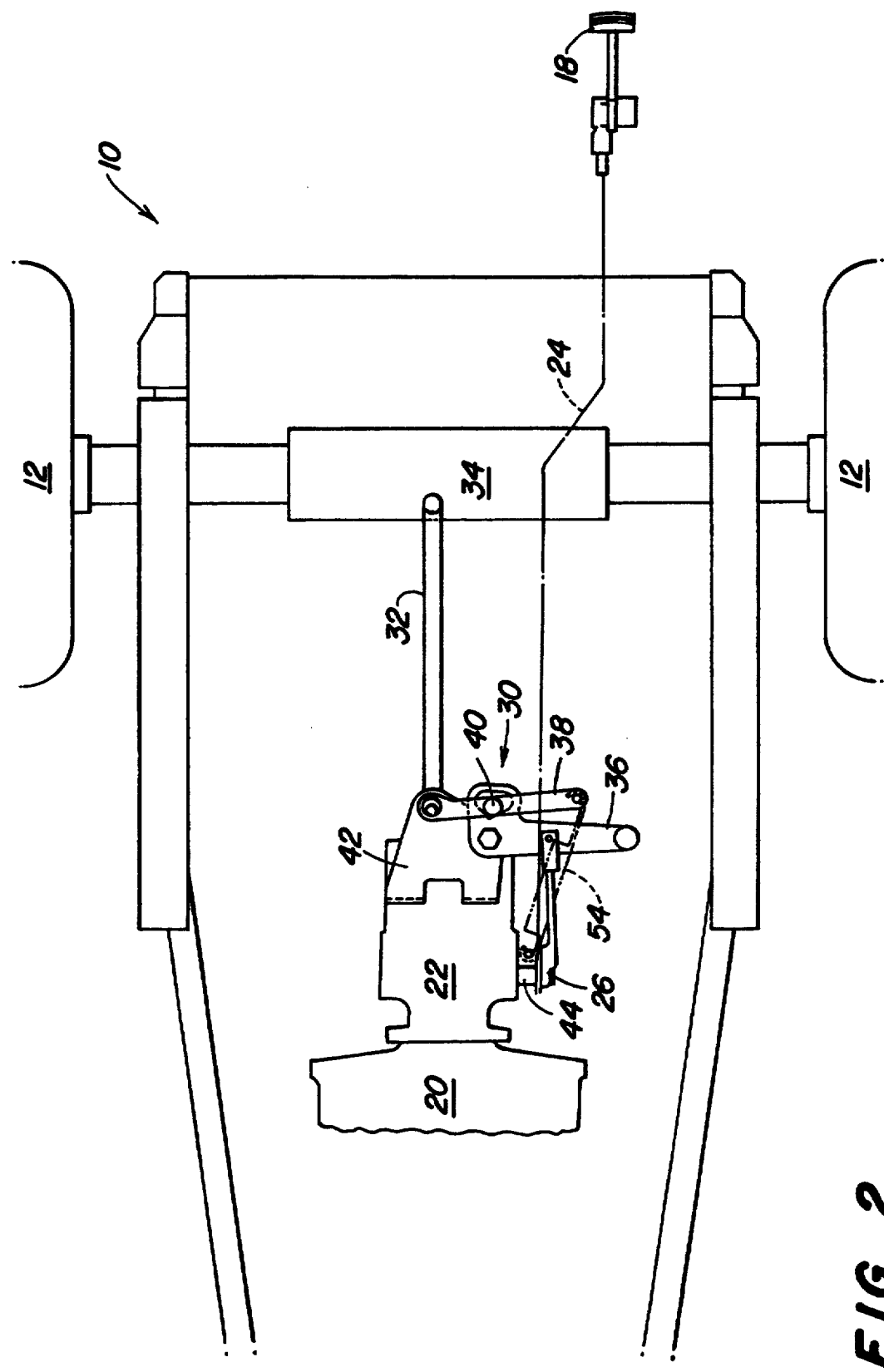
FIG. 2 is a schematic, partial plan view of the vehicle and directional,control structure of FIG. 1.

Looking now to FIG. 2, there is illustrated in plan view a partial schematic view of the vehicle 10, the drive wheels 12, the engine 20, the hydrostatic transmission 22, and the hydraulic line 32 between the transmission 22 and the drive unit 34 for the front wheels 12. Further included in schematic form, is the directional control linkage 24 between the operator foot pedal 18 and the transmission control lever 26. The neutral locator structure 30 includes a cam lever 36 and control link 38 with a cam roller 40. This neutral location structure 30 is carried on a bracket 42 which is secured to the casing of the transmission 22.

Looking now to FIGS. 3 and 4, enlarged schematic plan and side views of the transmission swash plate control structures are shown. In FIG. 3, the swash plate 28 is schematically shown in its three different positions. The swash plate 28 is contained within the transmission 22 and mounted to a shaft 44 for swinging movement therewith. As best seen in FIG. 5, the shaft 44 is tapered to tightly receive a hub 46 which in turn is provided with an opening 48 having a compatibility tapered configuration. As illustrated in FIG. 4, the control lever 26 in which the hub 46 is mounted, is swung either clockwise or counter-clockwise by the directional control linkage 24 that extends to the forward part of the vehicle 10 for activation through depression of the foot pedal 18.

Coupled to the top portion of the lever 26 is a rigid link 50 which is connected to the neutral locator structure 30 that is designed to precisely locate the swash plate 28 in its neutral or no-flow orientation when the operator releases pressure on the pedal 18. This structure or precisely locating means 30 is comprised of the actuating cam lever 36 having a V-shaped opening 52 and cam roller 40 mounted on the swingably mounted control link 58 and seated within the opening 52. The V-shaped control link 38, in turn, is connected to a biasing means such as a spring 54 which urges the roller 40 into the V-shaped opening 52 of the actuating lever 36. Both the control link 38 and the actuating cam lever 36 are pivotally secured to the mounting bracket 42 that is rigidly secured with a vehicle structure such as the transmission 22 (see FIG. 2). Thus as the operator takes his foot off the pedal 18, and the control lever 26 is free to move, the spring 54 of the neutral locating means 30 urges the roller cam 40 into the apex of the opening 52 to precisely position the lever 36. Through the rigid link 50, the control lever 26 is urged towards the position which maintains the swash plate 28 in neutral.

Looking now to FIGS. 5, 7 and 8, there is illustrated the actuating hub 46 and control lever 26 of the present invention along with a portion of the transmission shaft 44 that is coupled to the swash plate 28. A fastening means in the form of a bolt 56 and washer 57 is also provided to secure the lever 26 and hub 46 to the shaft 44.

The hub 46 in the preferred embodiment is produced from a powder metal process which forms the surfaces as shown on the hub 46, thereby avoiding the need for machining operations. The hub 46 includes the interiorally formed opening 48 which is tapered in a complementary fashion to the taper provided on the transmission shaft 44. Further provided to the interior of the hub 46 are keyway openings 58 and 60 as illustrated in the preferred embodiment at the 12 and 6 o'clock positions. These keyways 58–60 are designed to align with keyway openings 62–64 provided in the shaft 44. One larger keyway openings 58–62 is provided to more positively locate and secure the hub 46 to the shaft 44, see FIG. 8. Keys 66, one of which is shown in FIG. 8, would be provided to lock the hub 46 to the shaft 44 and secure it in the desired orientation relative to the shaft 44. In alternate applications, only one of the keyways may be used, or three or more keyways could be provided in the hub 46 and shaft 44.

Further provided on the sides of the hub 46 for mounting the hub 46 within the lever structure 26 are a set of parallel with each other, and radially spaced from the axis 70 through the hub 46. The generally parallel surfaces 68, as is clear from FIG. 7, are also inclined with respect to the axis 70 of the hub 46 to orient it within the complementarily shaped opening 72 in the control lever 26. The inclined surfaces 68 not only position the hub 46 within the lever 26 but also serve to allow it to be tightly drawn into the lever 26 and carefully positioned therein. The first positioning means on the hub 46 includes the spaced apart and inclined portions or surfaces 68 which abut a second positioning means composed of complementary inclined surfaces or segments 74 in the lever 26, see FIG. 7. These surface 68, 74 serve to precisely position the hub 46 relative to the lever 26 and help eliminate slight movements between the hub 46 and the lever 26.

To install the actuating hub 46 on the shaft 44 requires that it is positioned with the keyway openings 60–64 and 58–62 aligned and the keys 66 inserted to orient it with respect to the shaft 44. Thereafter the control lever 26 could be positioned onto the hub 46 with the tapered surfaces 68–74 orienting the control lever 26 with respect to the hub 46. Previously, as illustrated in the prior art in FIG. 6, the hub 76 was first positioned on the control lever 78 and then secured thereto, such as by welding 80, whereupon the tapered opening 82 and keyway 84 were subsequently machined into the hub 76. With the present invention, the hub 46 can be made individually and then assembled to any lever configuration which has an opening compatably shaped to match and mate with the hub 46.

After assembling the lever 26 onto the hub 46, the washer 57 and bolt 58 can be attached with the bolt 84 being tightened into the shaft 44 to draw the tapered hub 46 onto the tapered shaft 44 to further secure the precise orientation between the hub 46 and shaft 44 and to also draw the lever 26 onto the hub 46 as the inclined surfaces 68, 74 between the hub 46 and lever 26 mate to precisely locate the lever 26 with respect to the hub 46.

Accordingly, there is provided a control lever-hub structure which can be precisely oriented with respect to the shaft of the transmission to precisely orient the swash plate in its forward, reverse or neutral orientations.

With the present invention there is provided an actuating hub that can quickly and easily be installed on a swash plate shaft and coupled with a variety of sizes or shapes of control levers having the appropriate opening provided therein for precisely and accurately positioning the swash plate shaft in its neutral orientation. Further, this hub structure can be quickly and easily fastened both to the shaft and to the lever, thereby eliminating the welding and subsequent machining operations previously associated with hub lever control structures such as illustrated in prior art in FIG. 6.

I claim:

1. For use with a vehicle including a hydrostatic transmission with a swash plate moveable between first, second and third positions which correspond respectively to forward, neutral and reverse vehicle drive configurations and a tapered shaft coupled with the swash plate for moving it between its first, second and third positions and a lever means adapted to rotatably swing the shaft and move the swash plate between its positions:
an improved means for precisely coupling the lever means with the shaft comprising;
a first positioning surface carried near the edge of a recess provided in the lever means;
hub means with a tapered opening formed therein having a central axis, the opening adapted to be slidably received on the tapered shaft,
the hub means further including an end portion receivable within the recess the lever means, said end portion including a second positioning surface having an elongated portion that is radially spaced from the central axis, the second positioning surface being engagable with the first positioning surface when the end portion of the hub means is received in the recess of the lever means, and means operatively interconnecting the hub means with the shaft whereby movement of the lever means effects swinging movement of the shaft.

2. The invention defined in claim 1 wherein the positioning surfaces of the lever means and hub means are inclined with respect to the axis of the hub means opening.

3. The invention defined in claim 2 wherein the first and second positioning surfaces in the lever means and the hub means are flat surfaces that are engagable when the end portion of the hub means is received in the recess of the lever means.

4. The invention defined in claim 1 wherein the shaft and hub means are provided with keyways wherein key means are received to angularly orient the hub means with respect to the shaft.

5. The invention defined in claim 4 wherein the shaft and hub means are each provided with second keyways adapted to receive second key means.

6. The invention defined in claim 1 wherein the vehicle further includes manually activatable direction control means coupled with the lever means.

7. The invention defined in claim 1 wherein the shaft and hub means are provided with fastening means for securing them together and with the shaft.

8. The invention defined in claim 1 wherein the vehicle includes a neutral locator means operatively coupled with the lever means, the locator means being operative to urge the lever means towards an orientation that maintains the swash plate in its neutral position.

9. The invention defined in claim 8 wherein rigid link means is provided between the lever means and the neutral locator means.

10. The invention defined in claim 1 wherein the first positioning surface formed in the lever means at the edge of the recess includes first and second spaced apart generally flat segments.

11. The invention defined in claim 10 wherein the first and second segments are located at opposite sides of the recess.

12. The invention defined in claim 1 wherein the surfaces of the tapered shaft and tapered opening in the hub means are provided with means for angularly orienting the hub means on the shaft.

13. The invention defined in claim 12 wherein the orienting means include keyways in the shaft means and hub means, each adapted to receive a common key.

14. The invention defined in claim 1 wherein the end portion of the hub means received within the recess of the lever means includes a seat that is abuttable with a portion of the lever means for limiting the movement of the hub means into the opening of the lever means.

15. The invention defined in claim 1 wherein the hub means and shaft are adapted to receive fastening means for securing them together.

16. The invention defined in claim 15 wherein the respective tapered surfaces in the hub means and on the shaft form an interference fit as the fastening means secure them together.

17. The invention defined in claim 1 wherein the shaft taper takes the form of a cone frustrum that has a generally smooth outer surface.

* * * * *

UNITED STATES PATENT AND TRADEMARK OFFICE
CERTIFICATE OF CORRECTION

PATENT NO. : 5,383,376
DATED : Jan. 24, 1995
INVENTOR(S) : Christopher Scott Thorman et al.

It is certified that error appears in the above-indentified patent and that said Letters Patent is hereby corrected as shown below:

Claim 6, Column 6, line 2 delete "direction" and insert --directional--.

Signed and Sealed this

Thirteenth Day of June, 1995

Attest:

BRUCE LEHMAN

Attesting Officer          Commissioner of Patents and Trademarks